April 14, 1953     A. O. HAWKINS     2,634,629

REVERSIBLE DRIVE MECHANISM

Filed Oct. 13, 1950     2 SHEETS—SHEET 1

INVENTOR.
Albert Owen Hawkins
BY Mason, Kolehmainen,
Rathburn & Wyss
Attorneys

Patented Apr. 14, 1953

2,634,629

UNITED STATES PATENT OFFICE 2,634,629

REVERSIBLE DRIVE MECHANISM

Albert Owen Hawkins, Kahoka, Mo., assignor to Devere Company, Racine, Wis., a corporation of Wisconsin Application October 13, 1950, Serial No. 189,933

13 Claims. (Cl. 74—780)

1

The present invention relates to a reversible drive mechanism, more particularly to a reversible drive mechanism which is adapted to rotate a driven member in either direction from a continuously rotating drive shaft, and the invention has for an object the provision of a reversible drive mechanism of this character which is simple and rugged in construction and reliable in its operation.

It is a further object of the present invention to provide a new and improved reversible drive mechanism which is compact in construction, economical to manufacture and which may be mounted as a unit on a rotatable drive shaft.

Another object of the present invention resides in the provision of a new and improved reversible drive mechanism which is arranged to be carried as a compact unit on the output shaft of a standard gear reduction mechanism and which may be actuated by simple control linkage to either a forward or a reverse position on either side of a neutral position.

A still further object of the present invention resides in the provision of a new and improved reversible drive mechanism which is carried entirely by a rotatable drive shaft and wherein the reversing mechanisms may be readily engaged and disengaged by relatively short linear travel of a simple control linkage.

It is another object of the present invention to provide a new and improved reversible drive mechanism in which a differential gear mechanism carried by a rotatable drive shaft is employed to reverse the direction of rotation of a driven member also carried by the drive shaft and wherein a compact, efficient, and reliable control mechanism is provided to actuate the differential gear mechanism to either a forward, neutral or reverse position.

Briefly, in accordance with one aspect of the present invention the reversible drive mechanism comprises a differential gear assembly including a driving gear positioned on the drive shaft and rotatable therewith, a differential gear ring rotatably mounted on the shaft and including a plurality of radially extending differential gears in engagement with the driving gear and a driven gear rotatably mounted on the shaft and engaging the differential gears. A control linkage is provided which is operable in a first position on one side of a neutral position to lock the driven gear and differential ring against relative rotation so as to drive the differential assembly as a unit in the same direction as the shaft and operable in a second position on the other side of the neutral position to hold the differential ring stationary to rotate the driven gear in the opposite direction from the shaft through the differential gears. In accordance with a further aspect of the invention, a drive sprocket is keyed to the driven gear and movable therealong and side thrust is exerted on the sprocket to lock the driven gear with the differential ring by means of a camming arrangement including a hub carried by the shaft adjacent the driven gear, a clutch disk keyed to the hub and movable thereon, a plurality of camming fingers carried by the hub and having right angle lever portions extending therealong, and a camming collar movable along the hub and adapted to engage the end portions of the camming fingers and move the same inwardly to exert side thrust on the clutch plate.

The invention, both as to its organization and method of operation, together with further objects and advantages thereof, will best be understood by reference to the following specification taken in connection with the accompanying drawings, in which.

Referring now more particularly to the drawings, the reversible drive mechanism of the present invention is adapted to be driven from a suitable prime mover (not shown) which supplies power to the V-belt pulley 10 of a suitable gear reduction mechanism indicated generally at 11. The output drive shaft 12 of the gear reduction mechanism 11 is arranged to drive a sprocket 13 in either the forward or the reverse directions through the reversible drive mechanism of the present invention. It will be understood that the sprocket 13 is connected by any suitable means such as a roller chain, or the like to the driven elements of the equipment.

Figure 3:
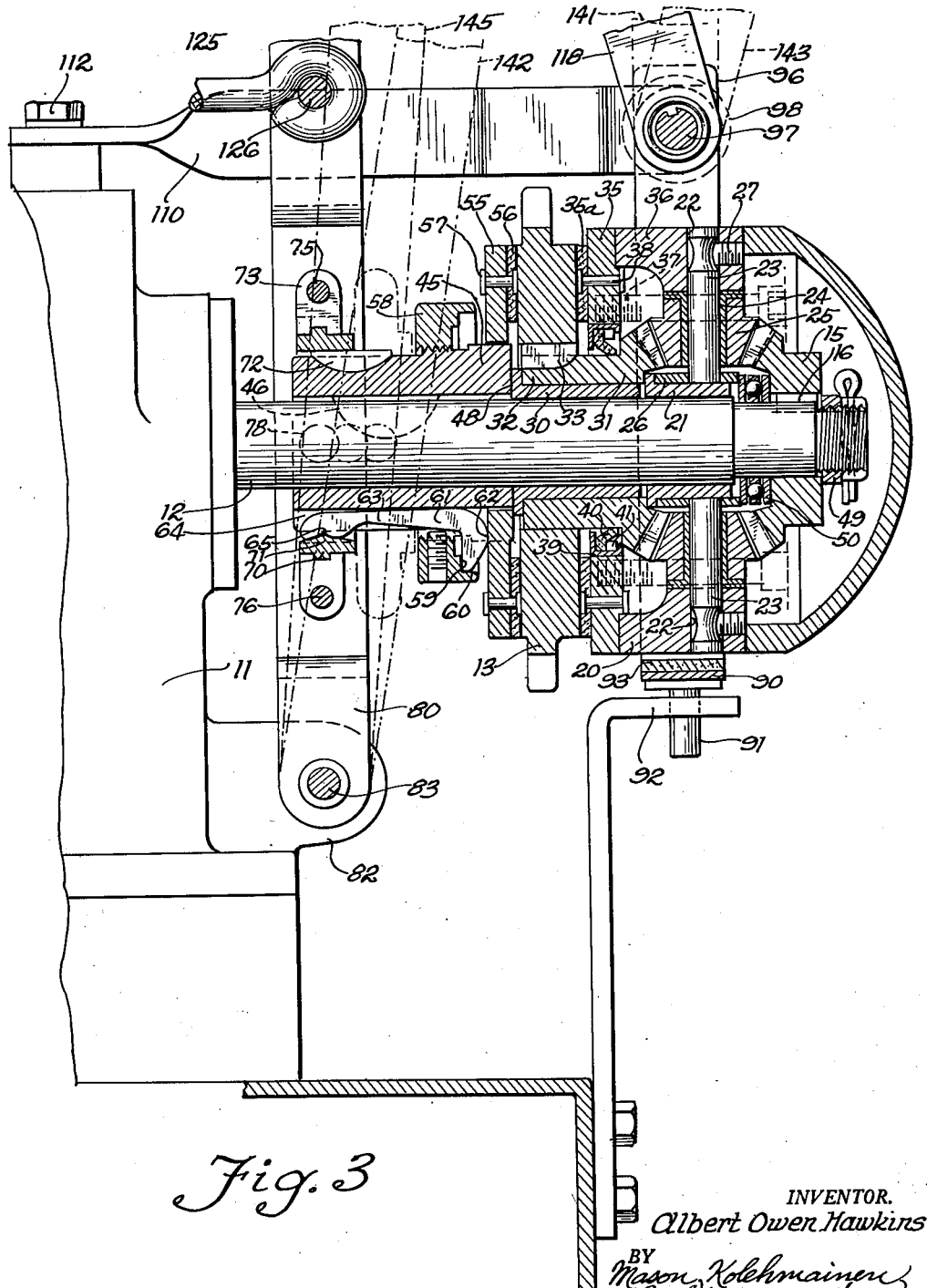
Fig. 3 is a sectional side elevational view on a larger scale taken along the lines 3—3 of Fig. 1.

In order to drive the sprocket 13 in either direction from the continuously rotating drive shaft 12, the reversible drive mechanism of the present invention is constructed as shown in detail in Fig. 3. As shown, there is provided a first bevel gear 15 which is supported on the end of the drive shaft 12 and is keyed thereto by means of the key 16 and which forms a part of a differential assembly that also includes a differential ring 20 supported for rotation about the drive shaft 12 on a sleeve bearing 21. The ring 20 is provided with a plurality of radially extending bores 22 adapted to receive the differential bearing shafts 23, each of which is provided with a sleeve bearing 24 which supports a differential bevel gear 25. The differential bevel gears 25 are adapted to mesh with the bevel gear 15 when the sleeve bearing 21 is correctly positioned on the drive shaft 12. The radially extending bearing shafts 23 are journaled at their inner ends in the collar 26 which is carried by the sleeve bearing 21 and are preferably locked against rotation by means of set screws 27 which engage grooved portions near the outer ends of the shafts.

To support the sprocket 13 on the drive shaft 12 and to permit rotation of the sprocket in the opposite direction from that of the drive shaft, there is provided a flanged sleeve bearing 30 which carries a second bevel gear 31 thereon. The bevel gear 31 is provided with an extended hub portion 32 which is provided with a keyway adapted to receive a longitudinally extending key 33. The sprocket 13 is carried on the extended hub portion 32 and is provided with a keyway which is adapted to receive the upper portion of the key 33 so that the bevel gear 31 and the sprocket are directly connected together at all times, although the sprocket may move along the hub portion 32.

In order to engage the sprocket 13 with the differential ring 20 so that these two members may be rotated as a unit and the sprocket 13 driven in the same direction as the drive shaft 12, there is provided an annular supporting disk 35 which is positioned on an outwardly extending flange portion 36 of the differential ring 20 and is secured to the differential ring by means of the bolts 37. The outer surface of the disk 35 is provided with a friction band 35a which is secured to the disk 35 by means of eyelets 38. In order to maintain a lubrication seal between the inner edge of the disk 35 and the hub portion of the bevel gear 31 there is provided a ring 39 which is of channel shaped cross section and is secured to the inner edge of the disk 35. A suitable resilient shaft seal member 40 is held in position by means of a retaining ring 41, the inner edge of the seal 40 engaging the hub of the bevel gear 31.

Figure 2:
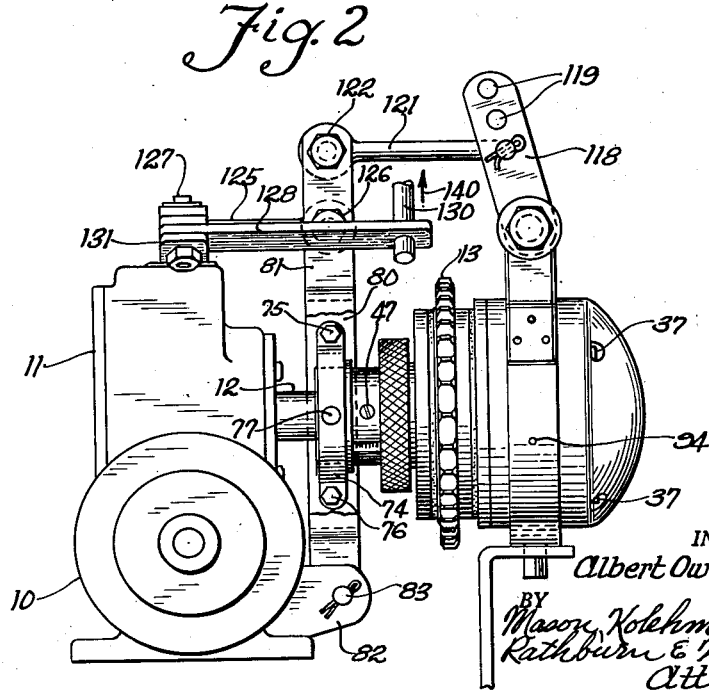
Fig. 2 is a front view of the reversible drive mechanism of Fig. 1.

To exert sidewise pressure on one side of the sprocket 13 so that it is urged into engagement with the friction band 35a and is directly driven from the drive shaft 12, there is provided a clutch drive assembly including a hub 45 which is keyed to the drive shaft 12 by means of the Woodruff key 46. The hub 45 is secured to the drive shaft 12 by means of a set screw 47 (Fig. 2) so that the end wall 48 of the hub provides a shoulder against which the above-described differential gear assembly may be held. Thus, the end of the drive shaft 12 is threaded to receive a nut 49, which, when tightened, urges the bevel gear 15 inwardly so as to exert sidewise pressure on the outer race of a thrust bearing 50 positioned between the hub of the bevel gear 15 and the end of the sleeve 26. The sleeve 26 is thus urged sidewise to exert pressure through the flange of the sleeve bearing 21 against the hub of the bevel gear 31, which, in turn, presses the flange of the sleeve bearing 30 against the end wall 48 of the supporting hub 45. With this arrangement the sleeve bearings 21 and 30 are properly spaced by means of the flange portions thereof to maintain the correct separation between these relatively rotatable members.

The clutch drive assembly further comprises a supporting disk 55 which is carried by the hub 45 at one end thereof and is provided with a friction band 56 secured thereto by means of eyelets 57. The friction band 56 is adapted to engage the side of the sprocket 13 opposite the band 35a. The clutch assembly also includes a flanged sleeve 58 which threads onto the hub 45 and is provided with a stepped portion which defines a shoulder 59. The shoulder 59 acts as a fulcrum or seat for the end portions 60 of a plurality of camming fingers 61 which are spaced about the hub 45. Each of the camming fingers 61 is provided with a projecting cam surface 62, adapted to engage the supporting disk 55, and a control lever portion 63 which is positioned in a slot 64 in the hub 45 and extends substantially perpendicular to the end portion 60. The lever portion 63 is provided with an enlarged end portion which projects beyond the hub 45 and has a notch 65 intermediate the length thereof. As the projecting end portions of the camming fingers are moved inwardly by means to be described in more detail hereinafter, it is seen that the fingers fulcrum about the end portions 60 thereof so as to move the cam surfaces 62 into engagement with the disk 55 thereby urging the band 56 against the sprocket 13 and moving the sprocket into engagement with the band 35a so that the sprocket is directly connected to the differential ring 20. In this connection it will be understood that the fingers 61 act as levers of the second class and the lever arm 63 thereof is of substantial length to provide substantial mechanical advantage.

In order to move the end portions of the camming fingers 61 inwardly in unison so that pressure is applied equally to spaced points around the disk 55 there is provided a camming collar 70 which is carried by the hub 45 and is secured thereto by means of the Woodruff key 72. The collar 70 is provided with projections 71 adjacent the fingers 61 which are adapted to engage the walls of the notches 65 and to act as a detent when the camming collar is moved axially of the shaft 12.

To move the camming collar 70 axially of the drive shaft 12 so that the collar may selectively engage the projecting end portions of the camming fingers and the sprocket may be correspondingly selectively engaged with the differential ring 20, there is provided a split bearing, comprising a pair of semicircular elements supported between opposed semicircular bands 73 and 74 which are clamped together at their meeting ends by means of the bolts 75 and 76. The supporting bands 73 and 74 are provided with projecting pins 77 and 78 which are positioned in line with the axis of the drive shaft 12 and are journaled in the side members 80 and 81 of a collar supporting carriage. This carriage is supported for pivotal movement about a point in line with the extremities of the camming fingers so that the camming collar 70 may be moved longitudinally along the drive shaft to engage the camming fingers as the carriage is pivoted. Thus, the base portion of the gear reduction mechanism 11 is provided with ear portions 82 which are adapted to receive a pin 83 which pin pivotally supports the lower extremities of the carriage members 80 and 81.

Figure 1:
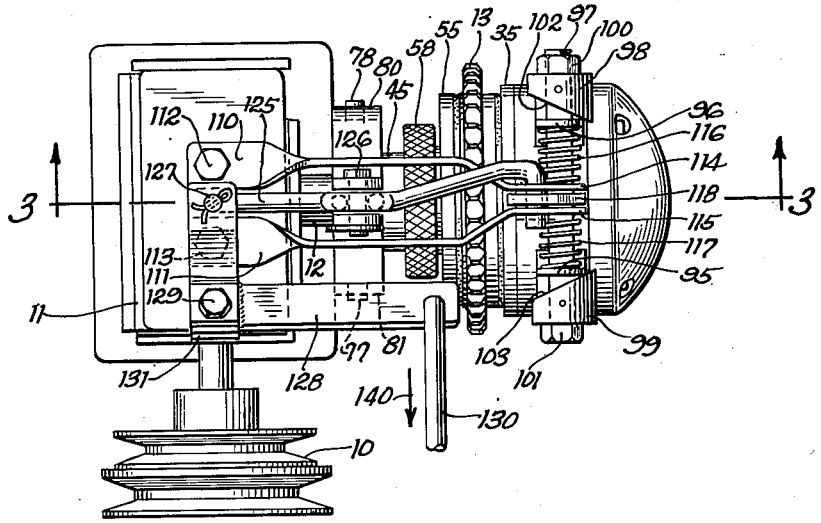
Fig. 1 is a top view showing a reversible drive mechanism and control linkage therefor embodying the present invention.

In order to clamp the differential ring 20 so that the sprocket 13 may be driven in the opposite direction from the shaft 12 through the differential bevel gears 25, there is provided a circular brake shoe 90 which is restrained from rotation by means of the pin 91 which extends loosely through an aperture in a supporting member 92 adjacent the bottom of the shoe 90. The shoe 90 is provided on the inner surface thereof with a friction band 93 which is adapted to engage the periphery of the differential ring 20 and is secured to the shoe by means of eyelets 94. The upper ends of the circular shoe 90 terminate in a pair of upstanding ears 95 and 96 which are apertured to receive a transverse pin 97 (Fig. 1). The pin 97 is provided at either end thereof with opposed cam members 98 and 99 which are positioned on opposite ends of the pin 97 by means of nuts 100 and 101. The cam members 98 and 99 are provided with inclined surface 102 and 103 which are adapted to engage the ears 95 and 96 so that rotation of the pin 97 in a given direction urges the upstanding ear portions 95 and 96 inwardly and the friction band 93 is clamped about the periphery of the differential ring 20 to prevent the same from rotating.

For the purpose of supporting the above-described brake band clamping assembly in position around the periphery of the differential ring 20, there is provided a pair of support arms 110 and 111 which are secured at one end to the housing of the gear reduction mechanism 11 by means of the bolts 112 and 113. The support arms 110 and 111 are spaced on either side of the upper ends of the carriage members 80 and 81. The free ends 114 and 115 of the support arms are positioned in spaced parallel relationship and are apertured to receive the central portion of the pin 97. The ears 95 and 96 are biased against the inclined surfaces of the cam members 98 and 99 by means of the coil springs 116 and 117 which are positioned between the ears 95 and 96 and the free ends 114 and 115 of the support arms.

In order to rotate the pin 97 so that the shoe 90 is closed about the periphery of the differential ring, there is provided an upstanding control arm 118 which is rigidly secured to the pin 97 between the ends of the support arms 110 and 111. The upper portion of the control arm 118 is provided with a series of apertures 119 which may receive one end of a cross arm 121, the other end of which is provided with an eye adapted to receive a bolt 122 which is supported in opposed apertures in the upper ends of the carriage members 80 and 81. Thus, as the carriage 80 and 81 is pivoted about the pin 83, the pin 97 is rotated through the linkage including the cross arm 121 and the control arm 118. To provide an adjustment of the degree of rotation of the shaft 97 for a given movement of the free end of the collar supporting carriage, the free end of the cross arm 121 may be positioned in a selected one of the apertures 119 in the end of the control arm 118.

In order to pivot the collar supporting carriage about the pin 83, there is provided a first control lever 125 which is provided at one end thereof with an eye adapted to receive the shank portion of a bolt 126 which is supported in the opposed upper portions of the collar supporting carriage. The other end of the lever 125 is provided with an upturned portion 127 which extends through an aperture in one end of a bell crank lever 128. The bell crank lever 128 is pivotally supported by a pivot pin 129 and the other end thereof is apertured to receive the end of an upper control 130. The upper control rod 130 is arranged to extend away from the reversible drive mechanism. For example, the control rod 130 may extend away from the drive mechanism in a line parallel to the operating handle of a lawn mowing machine and may be moved longitudinally by means of a hand-operated control lever (not shown) adjacent the extremity of the mower handle. Inasmuch as the upper control arm 130 extends away from the drive mechanism at an angle thereto, one arm of the bell crank lever 128 is preferably tilted so as to pivot in the same plane as the control arm 130 and the bell crank lever is supported on a projecting ear 131 which is secured to the gear reduction housing and extends upwardly at the same angle as the control arm.

Considering now the operation of the above-described reversible drive mechanism and its associated control linkage, it will be evident from the foregoing description that the collar supporting carriage and the differential ring clamping assembly may be controlled in unison by movement of the control arm 130 which affects a corresponding pivotal movement of the bell crank lever 128. When the carriage arms 80 and 81 occupy the position shown in full lines in Fig. 3 the projections 71 of the camming collar are positioned within the notches 65 of the camming fingers 61 which exert sidewise thrust upon the disk 55 and urge the disk 55 into engagement with the sprocket 13 so that the sprocket is clamped to the differential ring 36. With the sprocket and differential ring thus securely clamped together, the bevel gear 15 drives these elements as a unit in the same direction as the drive shaft 12 since rotation of the differential gears 25 about the pins 23 is prevented by the bevel gear 31. The above-described position of the collar supporting carriage may be termed a forward position and in this position it is essential that the brake band 93 be disengaged from the periphery of the differential ring 20 so as to permit the above-described rotation of the bevel gear 15 and the differential ring 20. Accordingly, when the carriage is in the forward position, the cam members 98 and 99 are so positioned on the pin 97 that the ears 95 and 96 engage in intermediate point on the inclined surfaces thereof. The band 93 is thus disengaged from the periphery of the differential ring.

When the control arm 130 is moved upwardly in the direction of the arrow 140 to a neutral position so as to pivot the collar supporting carriage to the position shown in dotted lines at 145 (Fig. 3) and the arm 118 to the position shown in dotted lines at 141, the carriage is moved to the right by a sufficient amount to disengage the camming collar from the end portions of the camming fingers 61 thus releasing the side thrust exerted by the camming fingers on the disk 55. Also, when the control arm 118 is moved to the position 141, the cam members 98 and 99 are correspondingly rotated. However, the position of these members on the pin 97 is so chosen that rotation of the arm to the position 141 does not tighten the brake band 93 sufficiently to engage the same with the periphery of the differential ring 20. Accordingly, when the side thrust on the sprocket 13 and the differential ring 20 is released, the ring rotates, due to the fact that the differential bevel gears 25 are now free to move relative to the bevel gear 31 so as to drive the ring 20 and the sprocket 13 is completely disengaged from the drive shaft 12.

When the control arm is moved further upwardly in the direction of the arrow 140 to "reverse" position, the carriage and the control arm 118 are correspondingly shifted so as to occupy the positions shown respectively in dotted lines at 142 and 143. When the collar supporting carriage is moved to the position 142, the movement of the camming collar 70 is in a direction away from the projecting portions of the camming fingers so that the disk 55 continues to be disengaged from the sprocket 13. However, movement of the control arm 118 to the position 143 is sufficient to rotate the cam members 98 and 99 to cam the lugs 95 and 96 inwardly by an amount sufficient to engage the friction band 93 with the periphery of the differential ring, thereby clamping the ring securely against rotation. With the ring 20 thus clamped, and the supporting disk 55 thus disengaged, the sprocket 13 is driven through the differential bevel gears 25 and the bevel gear 31 in a direction opposite to that of the drive shaft 12.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. A reversible drive mechanism, comprising a drive shaft, a driving gear secured to said shaft, a differential gear ring rotatably mounted on said shaft and including a plurality of radially extending differential gears in engagement with said first gear, a driven gear rotatably mounted on said shaft and engaging said plurality of differential gears, a sprocket carried on said driven gear and having a surface adjacent said differential ring, means for exerting side thrust on said sprocket to move said surface into engagement with said differential ring whereby said driven gear and said differential ring are locked against relative rotation and said sprocket is rotated in the same direction as said shaft, and means for holding said differential ring stationary when said side thrust exerting means is released, thereby to permit rotation of said sprocket in the opposite direction from that of said shaft through said differential gears.

2. A reversible drive mechanism, comprising a drive shaft, a driving gear positioned on said shaft and rotating therewith, a differential gear ring rotatably mounted on said shaft and including a plurality of radially extending differential gears in engagement with said first gear, a driven gear rotatably mounted on said shaft and engaging said plurality of differential gears, a sprocket keyed to said driven gear and movable therealong, said sprocket having a surface adjacent said differential ring, means for exerting side thrust on said sprocket to move said surface into engagement with said differential ring whereby said driven gear and said differential ring are locked against relative rotation and said sprocket is rotated in the same direction as said shaft, a stationary friction band positioned adjacent the periphery of said differential ring, and means including a pair of opposed cam members positioned adjacent the ends of said band for tightening said band about said differential ring to hold said ring fixed, thereby to permit rotation of said sprocket in the opposite direction from that of said shaft through said differential gears.

3. A reversible drive mechanism, comprising a drive shaft, a driving gear positioned on said shaft and rotating therewith, a differential gear ring rotatably mounted on said shaft and including a plurality of radially extending differential gears in engagement with said first gear, a driven gear rotatably mounted on said shaft and engaging said plurality of differential gears, a sprocket keyed to said driven gear and movable therealong, said sprocket having a surface adjacent said differential ring, means for exerting side thrust on said sprocket to move said surface into engagement with said differential ring whereby said driven gear and said differential ring are locked against relative rotation and said sprocket is rotated in the same direction as said shaft, a stationary friction band positioned adjacent the periphery of said differential ring, means including a pair of opposed cam members positioned adjacent the ends of said band for tightening said band about said differential ring to hold said ring fixed, thereby to permit rotation of said sprocket in the opposite direction from that of said shaft through said differential gears, and control linkage means for preventing the simultaneous engagement of said sprocket and said friction band with said differential ring.

4. A reversible drive mechanism, comprising a drive shaft, a driving gear positioned on said shaft and rotating therewith, a differential gear ring rotatably mounted on said shaft and including a plurality of radially extending differential gears in engagement with said first gear, a driven gear rotatably mounted on said shaft and engaging said plurality of differential gears, and means for locking said driven gear and said differential ring against relative rotation thereby to rotate said driven gear in the same direction as said shaft, said last named means comprising a drive sprocket keyed to said driven gear and movable therealong, said sprocket having a surface adjacent said differential ring, a hub carried by said shaft adjacent said driven gear, a clutch disk keyed to said hub and movable therealong, a plurality of camming fingers carried by said hub, each of said fingers having a clutch disk engaging cam surface and a right angle lever portion terminating in a projecting end portion, and a camming collar movable along said hub for engaging said end portions and moving the same inwardly thereby to exert side thrust on said clutch plate and urge said sprocket into engagement with said differential ring.

5. A reversible drive mechanism, comprising a drive shaft, a driving gear positioned on said shaft and rotating therewith, a differential gear ring rotatably mounted on said shaft and including a plurality of radially extending differential gears in engagement with said first gear, a driven gear rotatably mounted on said shaft and engaging said plurality of differential gears, a drive sprocket keyed to said driven gear and movable therealong, a hub carried by said shaft adjacent said driven gear, a clutch disk keyed to said hub and movable therealong, a plurality of camming fingers carried by said hub and adapted to engage said clutch disk, a camming collar carried by said hub and movable therealong to engage the end portions of said camming fingers thereby to exert side thrust on said clutch disk, a cylindrical brake band adjacent the periphery of said differential ring, a control pin extending through the end portions of said band, a pair of opposed cam members carried by said control pin and engaging the ends of said brake band, and a control linkage interconnecting said control pin and said camming collar whereby both said camming collar and said brake band are disengaged in a neutral position, said connecting collar is engaged with said camming fingers in a forward position, and said brake band is engaged with said differential ring in a reverse position.

6. A reversible drive mechanism, comprising a rotatable drive shaft, a differential gear mechanism carried by said drive shaft and including a first beveled gear arranged to rotate with said shaft and a differential gear ring carried by said shaft, a sprocket carried by said shaft adjacent said differential ring, means for exerting side thrust on said sprocket to engage the same with said differential ring, means for holding said differential ring stationary, and a control linkage operable in a first position to actuate said side thrust exerting means and operable in a second position to actuate said differential ring holding means.

7. A reversible drive mechanism, comprising a rotatable drive shaft, a sprocket carried by said shaft, a differential gear mechanism including a differential gear ring rotatable with respect to said shaft, means for holding said differential gear ring stationary to permit said sprocket to be driven from said drive shaft in a direction opposite thereto, means for releasing said differential ring holding means, and means for engaging said sprocket with said ring by exerting side thrust on said sprocket to permit rotation of said sprocket and said differential gear mechanism as a unit in the same direction as said drive shaft.

8. A reversible drive mechanism, comprising a drive shaft, a sprocket carried by said shaft, a differential gear mechanism carried by said shaft and including a differential gear ring rotatable with respect to said shaft, clutch means carried by said shaft for moving said sprocket into engagement with said differential ring, brake band means positioned about the periphery of said differential gear ring, and control means operable in a first position to engage said clutch means with said sprocket, whereby said sprocket is driven in the same direction as said shaft, and operable in a second position to disengage that of said clutch and tighten said brake band means thereby to hold said differential ring stationary, whereby said sprocket is driven through said differential gear mechanism in a direction opposite to that of said shaft.

9. A reversible drive mechanism, comprising a drive shaft, a differential gear mechanism carried by said shaft and including a rotatable differential gear ring and a rotatable bevel gear, a sprocket carried by said bevel gear, a hub carried by said shaft and positioned on the opposite side of said sprocket from said differential ring, a clutch disk carried by said hub, a clamping ring surrounding the periphery of said differential gear ring, means normally biasing said clamping ring away from said gear ring, means including a pair of opposed cam members for tightening said clamp about the periphery of said differential gear ring, and means operative when said clamping ring is disengaged for exerting side thrust on said clutch disk thereby to engage said sprocket with said differential gear ring.

10. A reversible drive mechanism, comprising a drive shaft, a first bevel gear secured to said drive shaft, a differential gear ring rotatably mounted on said drive shaft and including a plurality of differential bevel gears adapted to engage said first bevel gear, a second bevel gear rotatably mounted on said shaft and adapted to engage said differential bevel gears, said second bevel gear having an extended hub portion, a sprocket carried on said hub portion and movable therealong to engage said differential ring, a plurality of substantially right angle camming fingers carried by said shaft and having projections at the extremities thereof, a camming collar surrounding said fingers and adapted to move along said shaft to engage said projections and cam said fingers inwardly, a brake band adjacent the periphery of said differential ring, a pin extending through the end portions of said band and carrying opposed cam members at either end thereof adapted to contract said band when said pin is rotated in a given direction, a carriage pivoted about a point displaced from said shaft for moving said collar along said shaft, and means for rotating said pin in said given direction as said carriage is pivoted in a direction to move said collar out of engagement with said camming fingers.

11. A reversible drive mechanism, comprising a drive shaft, a first bevel gear secured to said drive shaft, a differential gear ring rotatably mounted on said drive shaft and including a plurality of differential bevel gears adapted to engage said first bevel gear, a second bevel gear rotatably mounted on said shaft and adapted to engage said differential bevel gears, said second bevel gear having an extended hub portion, a sprocket carried on said hub portion and movable therealong, a clutch plate carried by said shaft and adapted to press said sprocket against said differential ring when side thrust is exerted thereon, a plurality of camming fingers carried by said shaft and having projections at the extremities thereof, a camming collar surrounding said fingers and adapted to move along said shaft to engage said projections, said fingers exerting side thrust on said clutch plate when urged inwardly by engagement with the inner edge of said camming collar, a brake band adjacent the periphery of said differential ring, a pin extending through the end portions of said band and having opposed screw cam members at either end thereof adapted to contract said band when said pin is rotated in a given direction, means including a carriage pivoted about a point displaced from said shaft for moving said collar along said shaft, and means for rotating said pin in said given direction as said carriage is tilted to move said collar out of engagement with the projecting portions of said camming fingers.

12. A reversible drive mechanism, comprising a drive shaft, a driving gear secured to said shaft, a differential gear ring rotatably mounted on said shaft and including a plurality of radially extending differential gears in engagement with said first gear, a driven gear rotatably mounted on said shaft and engaging said plurality of differential gears, a driven member carried by said driven gear and having an annular surface adjacent said differential ring, means for exerting side thrust on said driven member to move said surface into engagement with said differential ring, whereby said driven gear and said differential ring are locked against relative rotation and said driven member is rotated in the same direction as said shaft, and means for holding said differential ring stationary when said side thrust exerting means is released, thereby to permit rotation of said driven member in the opposite direction from that of said shaft through said differential gears.

13. A reversible drive mechanism, comprising a drive shaft, a driving gear secured to said shaft, a differential gear ring rotatably mounted on said shaft and including a plurality of radially extending differential gears in engagement with said first gear, a driven gear rotatably mounted on said shaft and engaging said plurality of differential gears, a driven member keyed to said driven gear and slidable axially therealong and having an annular surface adjacent said differential ring, means for exerting side thrust on said driven member to move said surface into engagement with said differential ring, whereby said driven gear and said differential ring are locked against relative rotation and said driven member is rotated in the same direction as said shaft, and means for holding said differential ring stationary when said side thrust exerting means is released, thereby to permit rotation of said driven member in the opposite direction from that of said shaft through said differential gears.

ALBERT OWEN HAWKINS.

References Cited in the file of this patent

UNITED STATES PATENTS

| Number | Name | Date |
|---|---|---|
| 644,527 | Lytel | Feb. 27, 1900 |
| 795,499 | Evans et al. | July 25, 1905 |
| 1,029,610 | Harrington | June 18, 1912 |
| 1,334,003 | Sweat | Mar. 16, 1920 |
| 1,512,878 | Cook, Jr. | Oct. 21, 1924 |
| 1,583,714 | Holstrom | May 4, 1926 |
| 1,637,722 | Austin | Aug. 2, 1927 |
| 2,238,006 | Attridge | Apr. 8, 1941 |
| 2,277,367 | Railton | Mar. 24, 1942 |
| 2,490,398 | Aschauer | Dec. 6, 1949 |